United States Patent
Vajravel

(10) Patent No.: US 9,529,754 B1
(45) Date of Patent: Dec. 27, 2016

(54) PROTOCOL INDEPENDENT WAY TO RESERVE AND ASSIGN PREFERRED PORT NAMES FOR SESSION-ISOLATED USB SERIAL/PARALLEL PORT DEVICES

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/811,968

(22) Filed: Jul. 29, 2015

(51) Int. Cl.
  *G06F 13/38* (2006.01)
  *G06F 12/08* (2016.01)

(52) U.S. Cl.
  CPC ......... *G06F 13/385* (2013.01); *G06F 12/0884* (2013.01); *G06F 2212/603* (2013.01)

(58) Field of Classification Search
  CPC ................ G06F 13/385; G06F 12/0884; G06F 2212/603
  See application file for complete search history.

(56) References Cited

U.S. PATENT DOCUMENTS

2006/0069750 A1\* 3/2006 Momtchilov ........... H04L 67/10 709/219
2013/0297792 A1\* 11/2013 Kaushik ................. H04L 63/10 709/225

OTHER PUBLICATIONS

Named device objects by Windows at <https://msdn.microsoft.com/en-us/library/windows/hardware/ff556420(v=vs.85).aspx>, 1 page, 2015, printed Jul. 28, 2015.
External naming of COM ports by Windows at <https://msdn.microsoft.com/en-us/library/windows/hardware/ff546502(v=vs.85).aspx>, 1 page, 2015, printed Jul. 28, 2015.

\* cited by examiner

Primary Examiner — Ernest Unelus
Assistant Examiner — Ronald Modo
(74) Attorney, Agent, or Firm — Baker Botts L.L.P.

(57) ABSTRACT

Assigning port names based on port name characteristics to multiple universal serial bus (USB) devices where session-level restriction is enabled permits multiple users to connect multiple USB devices to ports using the particular devices preferred port name. Characteristics of a USB device are stored, including a preferred port name. When a user requests connection to a USB device that has been redirected or virtualized, the filter driver at the server attempts to assign the USB device to the preferred port name according to one or more stored characteristics. In this way, multiple users may assign multiple USB devices to the same preferred port name.

20 Claims, 4 Drawing Sheets

PROTOCOL INDEPENDENT WAY TO RESERVE AND ASSIGN PREFERRED PORT NAMES FOR SESSION-ISOLATED USB SERIAL/PARALLEL PORT DEVICES

TECHNICAL FIELD

This disclosure relates generally to information handling systems and, more particularly, to protocol independent systems and methods for reserving and assigning preferred port names for session-isolated universal serial bus (USB) serial/parallel port devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

A thin client, or as it is sometimes referred to a lean client or a slim client, is an information handling system or an executable software program running on an information handling system. A thin client generally relies on another information handling system, such as a server, to fulfill at least some of the requested computational roles. For example, a user can access applications or other computational support services from a server by logging into the server from a thin client, for example, a terminal device. Multiple users may log into the same server from multiple terminal devices and may simultaneously request services from the server.

For some legacy devices, the serial and parallel ports are deprecated and may not be available to more modern information handling systems. For example, in modern information handling systems the common hardware interface may be a Universal Serial Bus (USB). To support the deprecated ports of the legacy information handling systems, some vendors implement converters that create appropriate port names (or symbolic links) to permit modern applications to access more recent devices, for example, devices that use only USB as an interface. In this manner, legacy devices may be used with modern information handling systems. For example, legacy barcode scanners, credit card swiping machines, credit card skimmers and other legacy devices known to one of ordinary skill in the art may be accessed by modern information handling systems.

However, one difficulty with implementing converters is not only the limitation on the number of devices that may be accessed but also that certain devices require specific port names to function properly and/or efficiently. Because each user is assigned a different port for each accessed device, the number of devices the user is attempting to access may exceed the number recognizable by legacy information handling systems and may encompass port names required for devices needed by other users. For example, in a multi-user environment with USB redirection/virtualization, when several users connect and redirect USB serial/parallel port devices, the port name assignments may not only easily exceed the maximum recognizable number of ports (for example, COM 8 or LPT 256) leaving the user unable to access the desired devices but also restrict the use of common ports (for example, COM 1 or LPT 1).

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
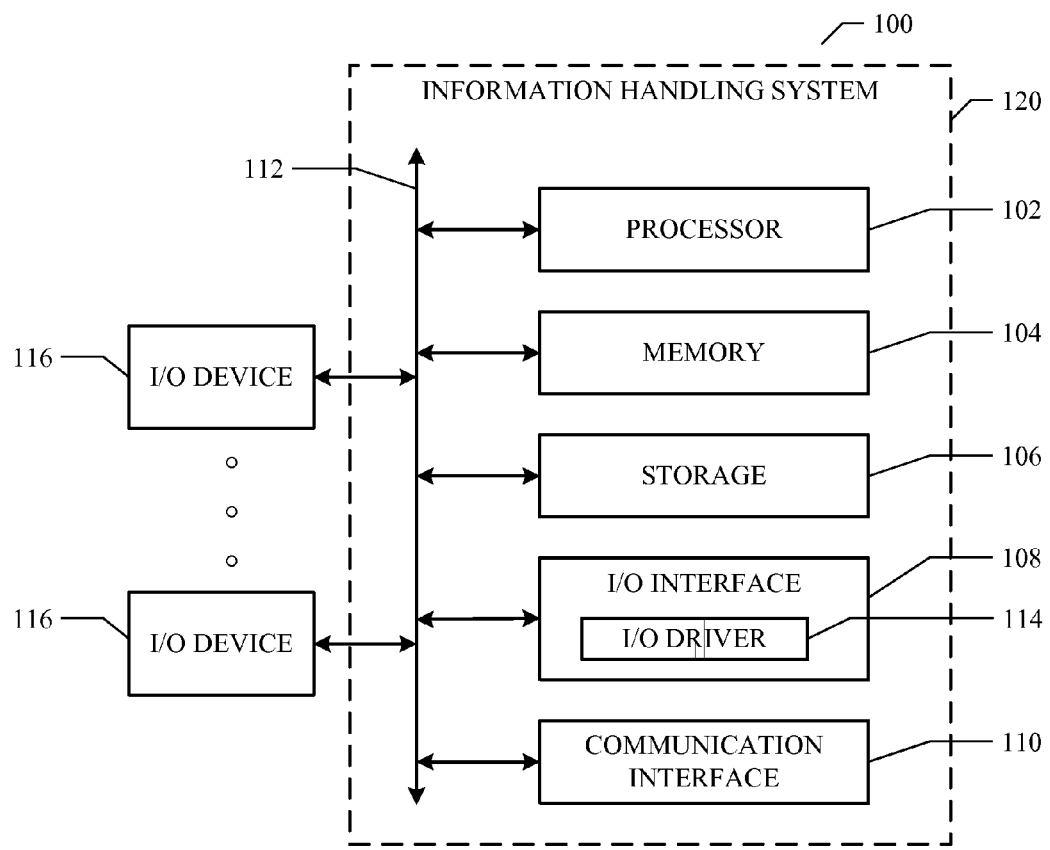
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a facsimile machine, a printer, keyboard, a mouse, a wireless device, a video display, and any other I/O device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

FIG. 1 illustrates an example information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system, such as information handling system 120, may encompass a computing device, and vice versa, where appropriate. Moreover, reference to an information handling system 120 may encompass one or more information handling systems 120, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks.

Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more I/O devices 116. Information handling system configuration 100 may include one or more of these I/O devices 116, where appropriate. In particular embodiments, the I/O device 116 may be a device with a USB interface, a serial port interface, a parallel port interface, or a combination thereof. One or more of these I/O devices 116 may enable communication between a user and information handling system 120. As an example and not by way of limitation, an I/O device 116 may include a keyboard, keypad, microphone, monitor, mouse, printer, scanner, speaker, still camera, stylus, tablet, touch screen, trackball, video camera, another suitable I/O device 116 or a combination of two or more of these I/O devices 116. An I/O device 116 may include one or more sensors. This disclosure contemplates any suitable I/O devices 116 and any suitable I/O interfaces 108 for them. Where appropriate, I/O interface 108 may include one or more I/O drivers (such as device or software) drivers 114 enabling processor 102 to drive one or more of these I/O devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
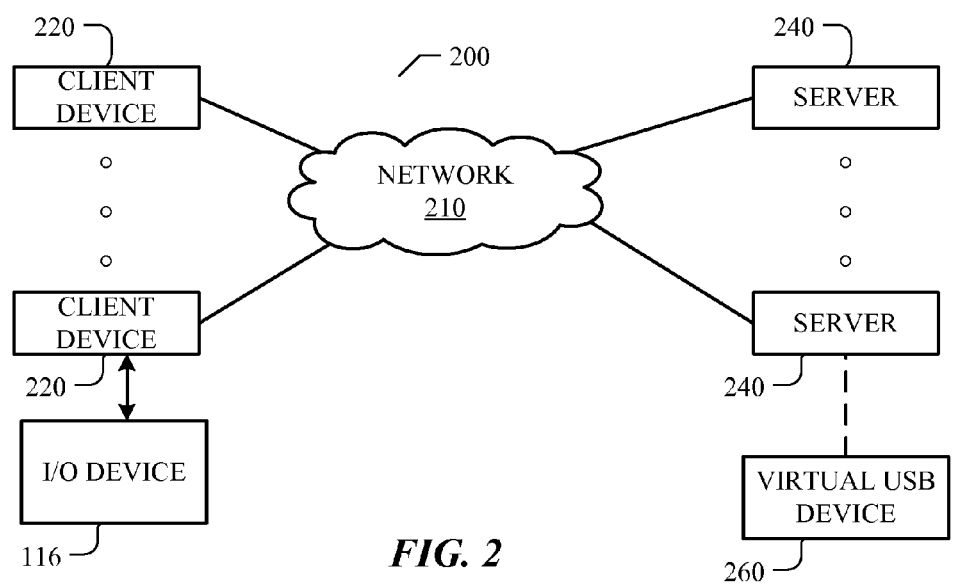
FIG. 2 is an example of a network environment.

FIG. 2 illustrates an example configuration of networked information handling systems generally at 200 including client devices 220 and servers 240. In particular embodiments, client devices 220 and servers 240 may be any one or more of the information handling systems 120 as previously described. In particular embodiments, one or more client devices 220 and one or more servers 240 are connected via network 210 to form a multi-user environment. Network 210 may be a public network or a private (for example, corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. In particular embodiments, client device 220 may be coupled to an I/O device 116. Client device 220 may couple to I/O device 116 via a wired or wireless connection or by any manner known to one of ordinary skill in the art. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220. In particular embodiments, a server 240 may include a virtual USB device 260 that has the same properties as the I/O device 116 of client 220 as discussed with respect to FIG. 3.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories).

In particular embodiments, one or more servers 240 of a network 210 may include a device manager that may manage one or more client devices 220 (for example, thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (for example, automatically) device discovery, tracking of assets (for example, hardware or software inventory) at client devices, monitoring the status or health of client devices, applying one or more policies to client devices (including, for example, network settings of the client devices), or remote administration and shadowing of client devices. The device manager may deliver any suitable resources including, for example, operating systems, add-ons, content, or any other suitable data, applications, or images to one or more client devices 220 of network 210.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. Reference to client device 220 and to a user of client device 220 should be understood in the singular as well as the plural. For example, client device 220 may refer to one or more client devices. Any given client device 220 may have one or more users associated with that client where each user has access to one or more I/O devices 116 coupled to the client device 220. One or more users of one or more client devices 220 may login to the same server 240 and perform tasks on the same server 240 substantially at the same time. In the VDI, one or more I/O devices may be connected to client device 220. In particular embodiments, in order for the I/O devices to work seamlessly, communications associated with the I/O devices may be redirected to a Virtual Desktop (VD) operating system (OS) or a Virtual Machine (VM) OS (for example, WINDOWS SERVER 2003) of the VDI. Furthermore, communications for one or more of the I/O devices may be restricted (for example, limited) only to a particular user-session, as in session-level-restriction (SLR) or session-isolation.

Session level restriction for a device may be implemented for many types of I/O devices 116 such as for example, printers, scanners, and storage devices (for example, mass storage, pen drive, hard drive, compact disc (CD), digital video disc (DVD), and BLU-RAY disc, or any other devices known to one of ordinary skill in the art). As an example and not by way of limitation, SLR may be implemented for an I/O device 116, such as a USB device, that is being operated by a current user or a current user session in a VM OS. In particular embodiments, a third-party kernel filter driver may be layered (or loaded) on top of every device class of the I/O device 116. Accordingly, one or more of the symbolic links in the device stack (of the I/O device 116) may be moved from global namespace to a pre-determined namespace of the user session. Furthermore, the third-party kernel filter driver may block other user sessions, for example, I/O requests of the other user sessions, operating in the VM OS from accessing the device stack. As such, the I/O device 116 may only be accessible by the current user or the current user-session.

In particular embodiments, I/O device 116 may be an SLR-enabled I/O device, for example, a USB device, that may include a single device class stack. As an example and not by way of limitation, an SLR-enabled USB printer may be associated with a printer device driver stack or a printer class stack (for example, WINDOWS Printer Class). As such, the third-party kernel filter driver may only handle the printer device driver stack. Herein, reference to a third-party kernel filter driver may encompass an SLR filter driver, or vice-versa, where appropriate. Herein, reference to a device class stack may encompass a device driver stack, or vice-versa, where appropriate. In particular embodiments, an SLR-enabled USB I/O device may have two or more device driver stacks.

Figure 3:
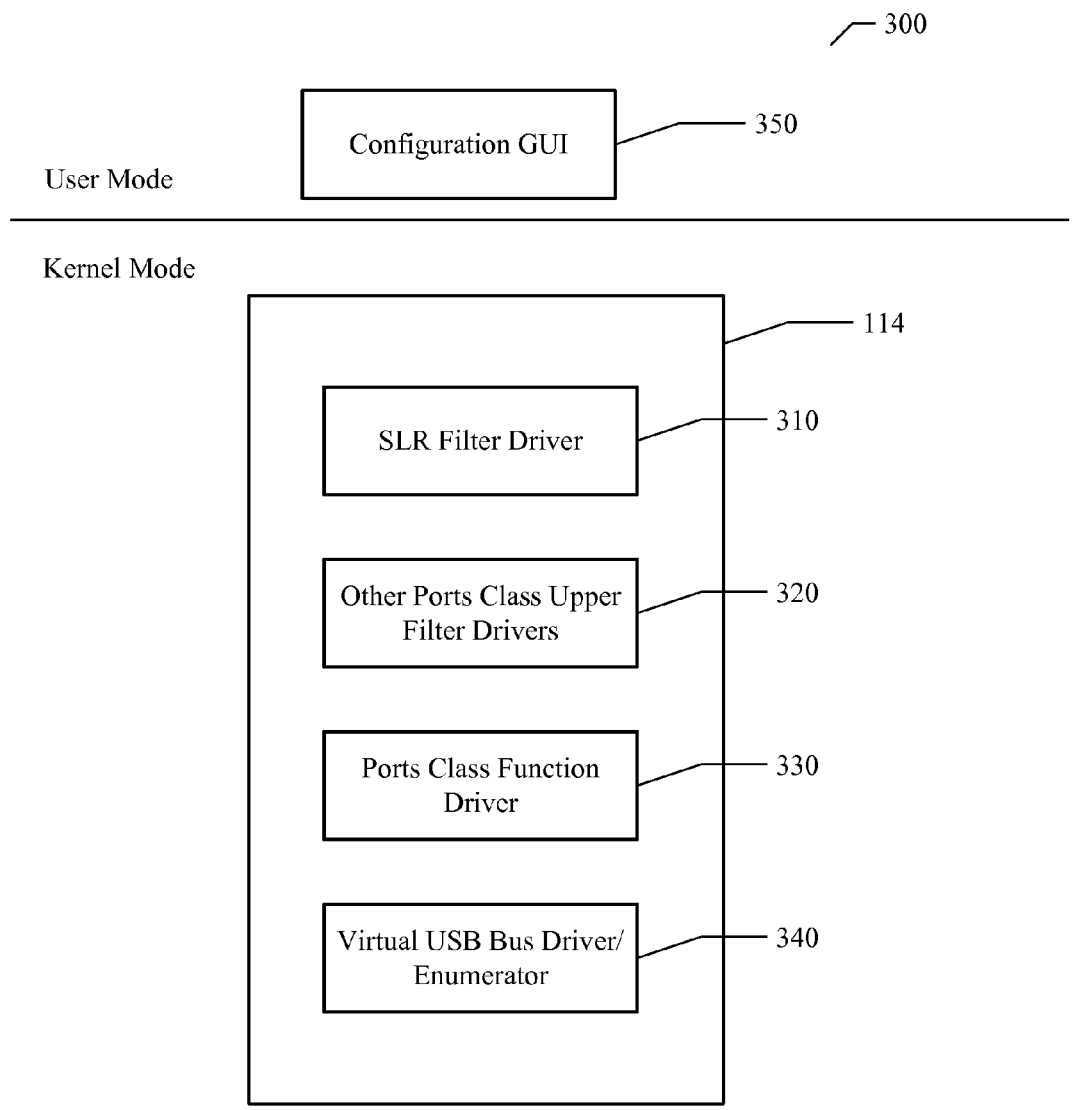
FIG. 3 is an example of selected elements of a driver for implementing an embodiment of the present invention.

FIG. 3 illustrates example components of an I/O driver 114, for example, a USB I/O driver. In particular embodiments, an I/O driver 114 may comprise an SLR filter driver 310, other ports class upper filter drivers 320, ports class function driver 330, and virtual USB bus driver/enumerator 340 and any other components known to one of ordinary skill in the art. In other embodiments, I/O driver 114 may not include other ports class upper filter drivers 320. In a particular embodiment, the virtual USB driver 340 is a Dell Wyse Virtual USB driver. One of ordinary skill in the art would understand that virtual USB bus driver 340 may be any virtual USB bus driver. When a notification is received that an I/O device 116 has been connected to a client 220, the virtual USB bus driver 340 creates a virtual USB device 260 with the same properties as the associated real I/O device (for example, I/O device 116.) For example, if a USB printer is connected to the parallel port of client 220, the virtual USB driver 340 will create a virtual USB printer with the same properties that the local USB printer has that is coupled to client 220. A symbolic link in global namespace, that is associated with the virtual USB device 260, will also be created by ports class function driver 330.

The ports class function driver 330 may, for example, be a ports class function driver for a serial port, a parallel port, or any combination thereof. The ports class function driver 330 handles serial port or parallel port functionalities for any given request by an application attempting to utilize the functionalities of the serial port or parallel port. In a particular embodiment, the ports class function driver 330 attempts to execute the functionality associated with the properties of the virtual USB device 260 using the appropriate protocol for the I/O device 116 that is associated with the virtual USB device 260. For example, if the I/O device 116 is coupled to the serial port of client 220, the ports class function driver 330 will attempt to establish a connection using a serial port protocol. In another example, I/O device 116 may be a credit card swiping machine that is coupled to a serial port of a remote computer, client 220. The virtual USB bus driver 340 creates a virtual USB credit card swiping device (for example, virtual USB device 260) that corresponds to the credit card swiping machine coupled to the remote computer. The ports class function driver 330 may read data from the virtual USB credit card swiping device to obtain, for example, the credit card data. The ports class function driver may also write data to the virtual USB credit card swiping device. The functionality executed by the ports class function driver 330 may be based, at least in part, on the functionality of the I/O device 116/virtual USB device 260 and the associated I/O driver 114.

In a particular embodiment, the other ports class upper filter driver 320 may include one or more third-party drivers. For example, a vendor may provide a driver that permits a certain port to operate in an optimized, more robust, power-saving, or other mode known to one of ordinary skill in the art. In a particular embodiment the I/O driver 114 may not include an other ports class upper filter driver 320. The SLR filter driver 310 provides additional functionality on top of the other ports class upper filter driver 320. In a particular embodiment, the SLR filter driver 310 is a Dell WYSE SLR filter driver, for example, tsrest.sys. One of ordinary skill in the art would understand that SLR filter driver 310 may be any SLR filter driver. The SLR filter driver 310 restricts access (provides session level restriction) to the virtual USB device 260 to the user-session associated with the client 220 (the remote computer coupled to the I/O device 116) by replacing the global namespace symbolic link with a port name symbolic link in the user's user-session namespace as discussed with respect to FIG. 4 and FIG. 5. Thus, the SLR filter driver 310 coordinates with the ports class function driver 330 and other ports class filter drivers 320 to create disjoint port names for the I/O devices 116 coupled to the client devices 220 in a multi-user network environment 200.

Configuration graphical user interface (GUI) 350 is a user interface that permits a user, such as an administrator, to input device characteristics for a particular device to be redirected or virtualized, such as I/O device 116. These characteristics are used to create the virtual USB device 260. Any number of device characteristics known to one of ordinary skill in the art may be set by the user, including, but not limited to, the write-protect status and the read/write access permissions for one or more users, preferred or required port name, vendor identification, and product identification. One or more of the characteristics may be stored in the system registry of the server 240, in an active directory or in any other location known to one of ordinary skill in the art. If stored in the registry, the stored characteristics apply only to the current server. If the characteristics are stored in the active directory, the characteristics may be used by other servers 240. For example, session level restrictions may be imposed that assign a particular device to a preferred port name. In one embodiment, the characteristics stored in the active directory include a variable that indicates which servers should use the stored characteristics. In another embodiment, the characteristics stored in the active directory include a variable that indicates which characteristics apply to a specific user. The virtual USB bus driver 340 caches one or more of these characteristics in its internal data structure.

In a particular embodiment, when user "A" couples one USB-to-serial device and one USB-to-parallel device, the port names "COM1" and "LPT1" may be assigned, respectively, in the user "A's" user-session namespace specifically such that "COM1" and "LPT1" refer only to user "A" coupled devices. The port names are assigned based, at least in part, on the stored characteristic related to preferred port name for the device. Likewise, when user "B" couples one USB-to-serial device and one USB-to-parallel device, the port names "COM1" and "LPT1" may be assigned, respectively, in the user "B's" user-session namespace specifically such that "COM1" and "LPT1" refer only to user "B" coupled devices. Just like for user "A", the port names are assigned based, at least in part, on the stored characteristic related to preferred port name. Thus, the port names "COM1" and "LPT1" are disjoint in that they are isolated to a specific user-session. In this way every user in the multi-user network environment 200 will have access to preferred port names and those port names will be well within the accessible range for each user's applications independent of any remoting protocols, such as, remote desktop protocol (RDP), independent computing architecture (ICA), personal computer over Internet protocol (PCoIP), or any other protocols known to one of ordinary skill in the art.

Figure 4:
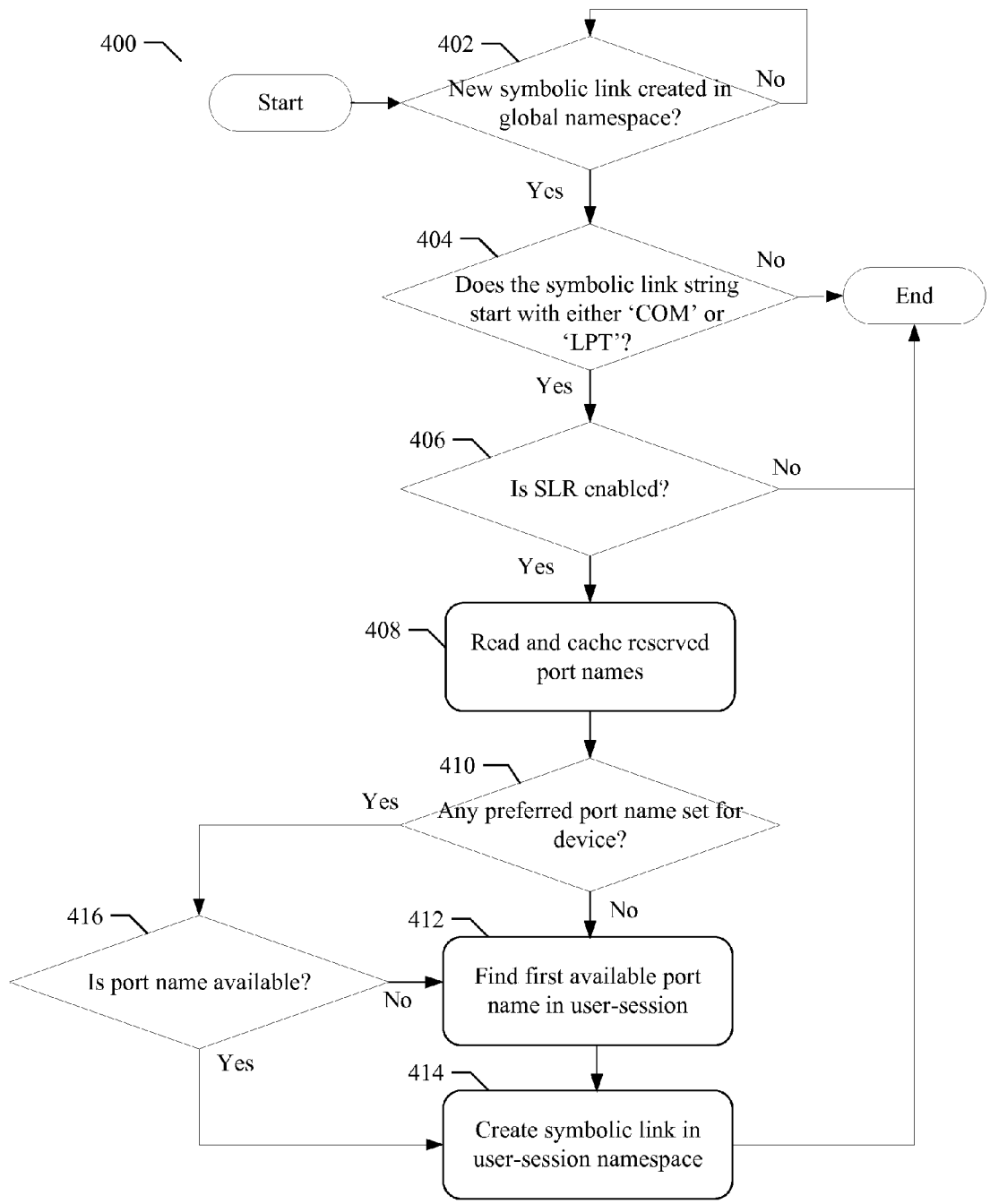
FIG. 4 is an example of a method for one embodiment according to the present disclosure.

FIG. 4 illustrates an example method to implement protocol independent reservation and assignment of preferred port names for session-isolated USB serial/parallel port devices by the SLR filter driver 310. Generally at 400, a method is provided for one embodiment according to the present disclosure. When SLR for ports class is enabled, access to an I/O device 116 is restricted by deleting the symbolic link created for the I/O device 116 in global namespace and creating the same symbolic link in user-session namespace. In particular embodiments, the I/O device 116 may be any I/O device as discussed above. In a multi-user environment, such as network environment 200, the preferred and available port names for a given client 220 or a server 240 may be exhausted by multiple users connecting multiple I/O devices 116. Users may be remote users, administrators, local users or any other type of user known to one or ordinary skill in the art. When subsequent users attempt to connect additional I/O devices 116, the connection requests may fail if available port names have been exhausted and may, in some circumstances, fail due to unavailability of preferred port names. For example, a legacy information handling system 120 may only permit a predetermined number of I/O devices 116 and thus may be limited to in the number of assignable ports, for example, COM 1 through COM 8 or LPT 1 through LPT 8, or any combination thereof. In a multi-user network environment 200, the port names may exceed the number permitted by the client device 220 or preferred port names may be taken by other users. FIG. 4 at 400 illustrates a method to allow each user access to not only the permissible number of I/O devices 116 by providing SLR without being compromised by the connections of other users but also to provide multiple users with the preferred port name for multiple devices.

At step 402 of FIG. 2, it is determined if a new symbolic link has been created for a newly created virtual USB device 260 which corresponds to a USB I/O device 116 coupled to a client 220. The method at 400 continuously monitors for the creation of a symbolic link. For example, as shown in step 402, the method loops back to step 402 if no symbolic link has been created. A symbolic link is created when a notification is sent to I/O driver 114 which creates a symbolic link as described with respect to FIG. 3. If a symbolic link has been created, then at step 404 it is determined whether the symbolic link string associated with the symbolic link begins with a specified port name prefix. For example, it may be determined at step 404 whether the symbolic link string begins with a prefix of either 'COM' or 'LPT' which indicates that I/O device 116 is connected to a serial port or a parallel port, respectively. If such strings are not found, the process ends, or rather, continues to process other methods.

Figure 5:
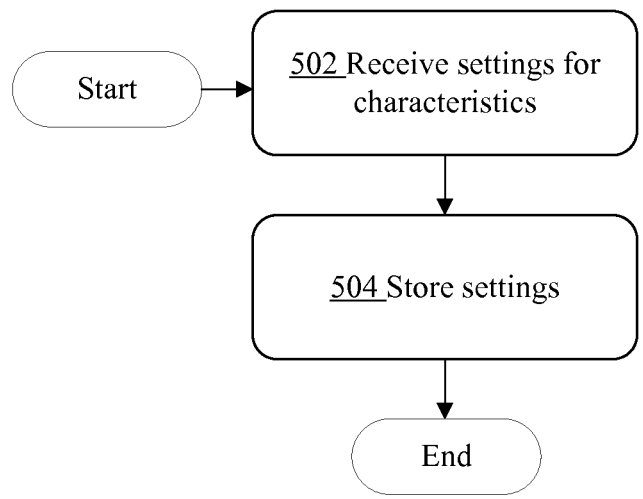
FIG. 5 is an example of a method for one embodiment according to the present disclosure.

If either of the strings are found, then at step 406 it is determined if SLR is enabled for the user. Next at step 408, the SLR filter driver 310 reads and caches the reserved port names for the devices for which characteristics have been stored that include a setting for the preferred port name. In one embodiment, a list of reserved port names is stored in a memory, such as memory 104 or storage 106 or any other location known to one of ordinary skill in the art. Such a list may be updated periodically or every time settings for characteristics are stored for a new device. In one embodiment, each time a new device is added and the process at 400 is implemented, the SLR filter driver 310 reads and caches the reserved port names. As shown in FIG. 5, it is illustrated generally at 500 one embodiment for obtaining settings for one or more characteristics associated with an I/O device 116. When a device, such as I/O device 116, is setup or initialized, a server 240 at step 502 may receive device-specific configuration data that may include settings for one or more characteristics of the device, including one or more characteristics associated with the preferred port name for the device. A user may input settings for one or more characteristics using a GUI, such as configuration GUI 340. Configuration GUI 350 may be a WYSE TCX configuration GUI or any other GUI known to one of ordinary skill in the art. At step 504, the device-specific configuration data (or settings for the one or more received characteristics) is stored. Configuration data may be stored in the server 240 registry or in an active directory.

At step 410, it is determined if a device, such as I/O device 116 has a preferred port name. The preferred port name may be retrieved from the stored settings for one or more characteristics associated with the I/O device 116. If a preferred port name has been set for the device, then the method continues to step 416. Even though the preferred port name for I/O device 116 (and its associated virtual USB device 260) has been reserved, for example, in a reserved port names table, it may be that another device with the same preferred port name was previously connected and assigned the requested preferred port name. Thus, it is necessary to determine at step 416 if the preferred port name is available. If it is available, then at step 414 a symbolic link is created in the user-session namespace using the preferred port name.

If at step 410, the preferred port name is not set (for example, no preferred port name characteristic found for the device) or if at step 416 the preferred port name is not available, then at step 412, the first available port name in the user-session is found and the process proceeds to step 414 where the symbolic link is created in user-session namespace using the first available port name.

In one embodiment, shown generally at 600, multiple USB devices are assigned port names according to the present disclosure. At step 602, a table is created from stored settings for one or more USB devices with the preferred port name for each of the one or more devices. For example, Device-A, Device-B, and Device C each have one or more stored characteristics, including, at least a stored setting for the preferred port name characteristic. Table 1 illustrates the preferred port name settings associated with each device.

TABLE 1

| USB Device | Preferred Port Name |
|---|---|
| Device-A | COM 1 |
| Device-B | COM 1 |
| Device-C | No Preference |

As shown in Table 1, Device-A and Device-B have the same preferred port name while Device-C does not have any setting for the preferred port name characteristic and thus has no preference as to which port name it is assigned. While only three USB devices are illustrated in Table 1, the table may include preferred port names for any number of USB devices. Also, these USB devices may have any preferred port name including LPT port names. For example, in one embodiment, the preferred port names may range from COM 1-COM 8 or from LPT 1-LPT 256 or any other ranges known to one of ordinary skill in the art.

At step 604, newly redirected or virtualized USB devices 260 are identified for a given user-session. That is, a user has either connected locally new USB devices 116 or has connected to one or more virtual USB devices 260 and the user has SLR enabled. The USB devices 260 are identified in the order of connection. For example, Device-C may be connected first, followed by Device-A and then by Device-B.

At step 606, port names are assigned to the identified devices from step 604 according to one or more embodiments of the present disclosure, for example, the embodiment illustrated in FIG. 4. Device-C, the first connected USB device, does not have a preferred port name assigned. Thus, no reserved port names are used. In the current example, the list of reserved port names includes at least COM 1 but may also include other reserved port names. For example, the list of reserved port names may include LPT 1 which may be reserved for a particular type of USB parallel port printer. The first available unreserved port name is then assigned to Device-C, for example, COM 2. The second connected USB device, Device-A, is assigned COM 1 as a port name as TABLE 1 indicates that COM 1 is the preferred port name for Device-A. The third connected USB device, Device-B, also has COM 1 as the preferred port name. However, Device-A has been assigned COM 1. Thus, Device-B is assigned the next available unreserved port name, for example, COM 3.

The port names COM 1, COM 2, and COM 3 are now taken in the user-session for this user but these port names are still available for other users. That is, another user with SLR enabled may request connection of the same USB devices, Device-A, Device-B and Device-C. The USB devices may be connected in a different order, such that Device-B is connected before Device-A. For this second user, Device-B may then be assigned a port name of COM 1 while Device-A is assigned the port name of COM 3. Thus, multiple users may have the same port names assigned in their respective user sessions for the same USB devices, different USB devices, or any combination thereof.

Figure 6:
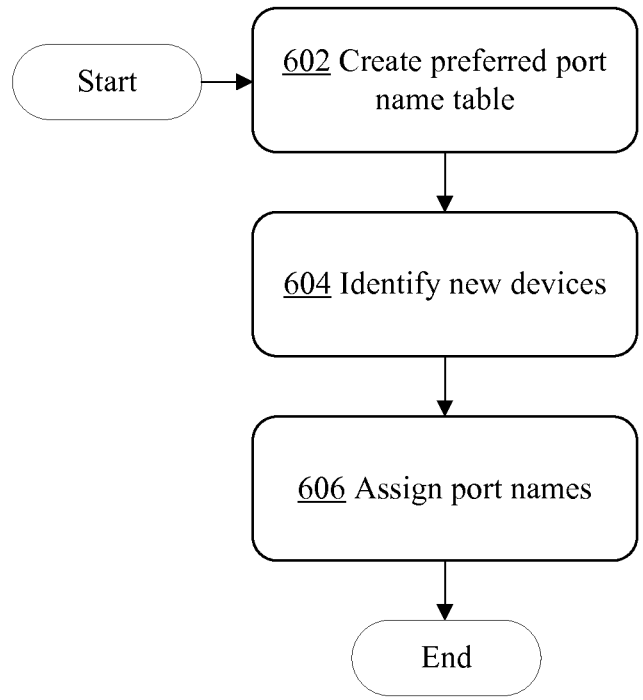
FIG. 6. is an example of a method for one embodiment according to the present disclosure.

In one embodiment the process of FIGS. 4, 5 and 6 may be implemented on the information handling system of FIG. 1 and as further illustrated in FIG. 2.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented. The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: receiving a request for a connection to a first virtual USB device by a first user of a first client;
   creating a first global namespace symbolic link in global namespace associated with the first virtual USB device, wherein the first virtual USB device is associated with a first I/O device;
   determining if the first global namespace symbolic link is associated with a port name of the first client; determining if session-level restriction is enabled for the first user; caching one or more reserved port names; determining if a first preferred port name characteristic exists for the first virtual USB device; determining if a first preferred port name is available, based, at least in part, on the first preferred port name characteristic; and creating a first symbolic link in a first user-session namespace, wherein the first user-session namespace is associated with the first user, and wherein the first symbolic link is based, at least in part, on the first preferred port name.

2. The method of claim 1, further comprising:
   requesting connection to a second virtual USB device from the first user, wherein the second virtual USB device has an associated second preferred port name that is the same as the first preferred port name;
   determining a first available port name in the first user-session; and
   creating a second symbolic link in the first user-session namespace, wherein the second symbolic link is based, at least in part, on the determined first available port name in the first user-session.

3. The method of claim 1, wherein port name prefix for the first preferred port name begins with "COM".

4. The method of claim 1, wherein port name prefix for the first preferred port name begins with "LPT".

5. The method of claim 1, further comprising:
   creating a table of one or more reserved port names, wherein the table of reserved port names comprises at least one or more preferred port names for one or more USB devices, wherein the step of caching comprises storing the one or more reserved port names from the table.

6. The method of claim 5, wherein the table comprises at least one unique identifier for one or more USB devices and at least one port name associated with the at least one unique identifier for the one or more USB devices.

7. The method of claim 1, further comprising:
   receiving one or more settings associated with one or more characteristics of the first USB device, wherein at least one of the characteristics corresponds to the first preferred port name for the first USB device; and
   storing the one or more settings.

8. The method of claim 7, wherein the settings are stored in an active directory.

9. One or more computer-readable non-transitory storage media embodying logic that is operable when executed to: receive a request for a connection to a first virtual USB device by a first user of a first client;
   create a first global namespace symbolic link in global namespace associated with the first virtual USB device, wherein the first virtual USB device is associated with a first I/O device;
   determine if the first global namespace symbolic link is associated with a port name of the first client; determine if session-level restriction is enabled for the first user; cache one or more reserved port names; determine if a first preferred port name characteristic exists for the first virtual USB device; determine if the first preferred port name is available, based, at least in part, on the first preferred port name characteristic; and create a first symbolic link in a first user-session namespace, wherein the first user-session namespace is associated with the first user, and wherein the first symbolic link is based, at least in part, on the first preferred port name.

10. The media embodying logic of claim 9, further operable when executed to:
    request connection to a second virtual USB device from the first user, wherein the second virtual USB device has an associated second preferred port name that is the same as the first preferred port name;
    determine a first available port name in the first user-session; and
    create a second symbolic link in the first user-session namespace, wherein the second symbolic link is based, at least in part, on the determined first available port name in the first user-session.

11. The media embodying logic of claim 9, wherein port name prefix for the first preferred port name begins with "COM".

12. The media embodying of logic of claim 9, wherein port name prefix for the first preferred port name begins with "LPT".

13. The media embodying logic of claim 9, further operable when executed to:
    create a table of one or more reserved port names, wherein the table of reserved port names comprises at least one or more preferred port names for one or more USB devices, wherein the step of caching comprises storing the one or more reserved port names from the table.

14. The media embodying logic of claim 13, wherein the table comprises at least one unique identifier for one or more USB devices and at least one port name associated with the at least one unique identifier for the one or more USB devices.

15. The media embodying logic of claim 9, further operable when executed to:
receive one or more settings associated with one or more characteristics of the first USB device, wherein at least one of the characteristics corresponds to the first preferred port name for the first USB device; and
store the one or more settings.

16. The media embodying logic of claim 15, wherein the settings are stored in an active directory.

17. An information handling system comprising: one or more processors; a memory coupled to the processors comprising instructions executable by the processors, the processors being operable when executing the instructions to: receive a request for a connection to a first virtual USB device by a first user of a first client;
create a first global namespace symbolic link in global namespace associated with the first virtual USB device, wherein the first virtual USB device is associated with a first I/O device;
determine if the first global namespace symbolic link is associated with a port name of the first client; determine if session-level restriction is enabled for the first user; cache one or more reserved port names; determine if a first preferred port name characteristic exists for the first virtual USB device; determine if the first preferred port name is available, based, at least in part, on a first preferred port name characteristic; and create a first symbolic link in a first user-session namespace, wherein the first user-session namespace is associated with the first user, and wherein the first symbolic link is based, at least in part, on the first preferred port name.

18. The information handling system of claim 17, wherein the processors being further operable when executing the instructions to:
request connection to a second virtual USB device from the first user, wherein the second virtual USB device has a second preferred port name that is the same as the first preferred port name;
determine a first available port name in the first user-session; and
create a second symbolic link in the first user-session namespace, wherein the second symbolic link is based, at least in part, on the determined first available port name in the first user-session.

19. The information handling system of claim 17, wherein the processors being further operable when executing the instructions to:
create a table of one or more reserved port names, wherein the table of reserved port names comprises at least one or more preferred port names for one or more USB devices, wherein the step of caching comprises storing the one or more reserved port names from the table.

20. The information handling system of claim 19, wherein the table comprises at least one unique identifier for one or more USB devices and at least one port name associated with the at least one unique identifier for the one or more USB devices.

* * * * *